J. LANE.
Rolling-Colter.

No. 223,151.   Patented Dec. 30, 1879.

WITNESSES:
W. W. Hollingsworth
Edw. W. Byrn

INVENTOR:
Joseph Lane
BY
ATTORNEYS.

UNITED STATES PATENT OFFICE.

JOSEPH LANE, OF CHICAGO, ILL., ASSIGNOR OF ONE-HALF OF HIS RIGHT TO SAMUEL STREET FULLER, OF STRATFORD, ONTARIO, CANADA.

IMPROVEMENT IN ROLLING COLTERS.

Specification forming part of Letters Patent No. 223,151, dated December 30, 1879; application filed October 24, 1879.

*To all whom it may concern:*

Be it known that I, JOSEPH LANE, of Chicago, in the county of Cook and State of Illinois, have invented a new and Improved Rolling Colter for Plows; and I do hereby declare that the following is a full, clear, and exact description of the same, reference being had to the accompanying drawings, forming part of this specification, in which—

Figure 1:
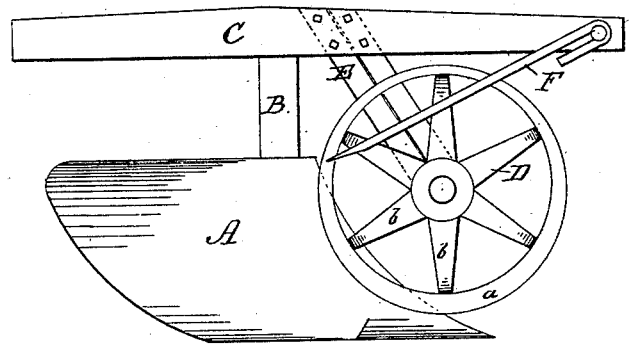
Figure 2:
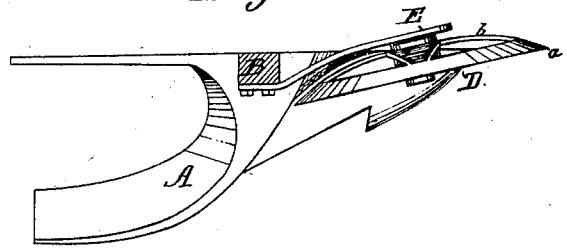
Figure 3:
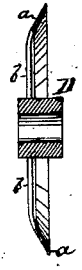

Figure 1 is a side view, showing the colter attached to the beam. Fig. 2 is a plan with the beam removed, and showing the colter attached to the standard; and Fig. 3 is a vertical detail of the colter.

My invention relates to rolling colters for plows; and it consists in combining with a mold-board plow a rolling colter made dished or concaved on the mold-board side, whereby the straw, grass, and manure are not only cut, but are turned over so that they will be completely covered by the plow, as hereinafter fully described.

In the drawings, A represents the plow; B, its standard; C, the beam, and D the rolling colter, which latter is mounted upon the forward end of an arm, E, projecting obliquely forward from the plow standard or beam, and upon which the colter is free to revolve just above the plow-point, as usual.

In constructing the colter, instead of making its cutting-edge in a true plane, as usual, I construct it in dished form and arrange it with the concave side on the mold-board side of the plow, and with the forward edge in the plane of the land-side and its rear edge diverging slightly therefrom, as shown in Fig. 2. In making it of a dished form I prefer to attach by bolts an inclined cutting-rim, a, to the radial arms of a spider-frame, b.

When the plow is in use the dished colter cuts the loose straw and grass in front, and as the rear edge of the colter is continually rising in revolving it catches, by reason of its dished form and inclined position, against the edges of the cut straw, manure, &c., and throws them over, so that the plow fully covers the same.

In connection with the colter, I employ a scraper, F, which is attached to the plow-beam and has its rearwardly-projecting point bent into the dish of the colter, so as to scrape the concave of the rim of any clay that may adhere. I do not claim this feature, however, as I am aware that a rolling colter has been provided with a scraper before.

Having thus described my invention, what I claim as new is—

The combination, with a mold-board plow, of a rolling-colter made in dished form and arranged with its dished or concave side on the mold-board side of the plow, as described.

The above specification of my invention signed by me this 13th day of October, A. D. 1879.

JOSEPH LANE.

Witnesses:
J. E. TERHUNE,
S. S. TIDLER.